United States Patent
Anderlind et al.

(10) Patent No.: US 6,697,435 B2
(45) Date of Patent: Feb. 24, 2004

(54) METHOD AND APPARATUS FOR ENABLING TRANSMISSION OF VARIABLE LENGTH ENCODED DATA IN A LOW SIGNAL TO NOISE RATIO ENVIRONMENT

(75) Inventors: Erik E. Anderlind, Morris, NJ (US); Laurence Eugene Mailaender, Hudson, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 71 days.

(21) Appl. No.: 10/101,697

(22) Filed: Mar. 21, 2002

(65) Prior Publication Data

US 2002/0090033 A1 Jul. 11, 2002

Related U.S. Application Data

(62) Division of application No. 09/312,711, filed on May 17, 1999.

(51) Int. Cl.[7] .............................................. H03M 7/30
(52) U.S. Cl. ..................................................... 375/253
(58) Field of Search .......................... 375/253, 257, 375/295, 130, 135, 140, 205, 279, 242, 259, 377, 145, 150; 348/420, 426; 371/37.1; 341/173, 175; 714/752, 786, 791

(56) References Cited

U.S. PATENT DOCUMENTS

| | | | | |
|---|---|---|---|---|
| 5,148,271 A | * | 9/1992 | Kato et al. .................... | 358/133 |
| 5,566,192 A | * | 10/1996 | Moon ........................ | 371/47.1 |
| 5,767,912 A | * | 6/1998 | Bunting et al. ............. | 348/426 |
| 5,881,070 A | * | 3/1999 | Hoshi ....................... | 371/37.01 |
| 5,990,963 A | * | 11/1999 | Mishima et al. ............ | 348/420 |
| 6,115,425 A | * | 9/2000 | Adachi et al. ................ | 375/25 |
| 6,430,226 B1 | * | 8/2002 | Ten Kate .................... | 375/253 |

OTHER PUBLICATIONS

W. Simpson, Editor: Daydreamer, "PPP in HDLC–like Framing," Jul. 1994, pp. 1–5.

* cited by examiner

*Primary Examiner*—Mohammad H. Ghayour
*Assistant Examiner*—Dung X. Nguyen (57) ABSTRACT

In order to transmit variable length encoded data in low signal to noise ratio environments, a first data pattern is added to a beginning portion of encoded data to signify a beginning of the encoded data. Further, a second data pattern is added to end portion of the encoded data to signify and end of the encoded data. Additionally, since the encoded data may naturally include the second data pattern and thereby mistakenly indicate an end of the encoded data, the encoded data is first checked for such a pattern. If the pattern is found within the encoded data, a new pattern is substituted therefore. In order to counter errors, patterns similar to the first data pattern are also substituted with new patterns. As such, a variable length encoded data can be transmitted in a low signal to noise ratio environment, and can thereafter be easily decoded.

17 Claims, 6 Drawing Sheets

METHOD AND APPARATUS FOR ENABLING TRANSMISSION OF VARIABLE LENGTH ENCODED DATA IN A LOW SIGNAL TO NOISE RATIO ENVIRONMENT

This application is a divisional of co-pending application Ser. No. 09/312,711, filed on May 17, 1999, the entire contents of which are hereby incorporated by reference and for which priority is claimed under 35 U.S.C. §120; and this application claims priority of Application No. _____ filed in _____ on under 35 U.S.C. §119.

BACKGROUND OF THE INVENTION

1. Field of the Invention

The present invention relates generally to transmission of data in a low signal to noise ratio environment, and more particularly to wireless transmission of data.

2. Description of Related Art

Currently, transmission of data in low signal to noise ratio environments or mediums, is done based on fixed frame length or fixed frame duration. A fixed frame duration is suitable for carrying voice data, as a voice encoders and decoders can be set to generate fixed length data samples (or a small set of sample lengths) within the frame interval. But for data traffic there is a large range of possible packet lengths and a mismatch between the packet length and a frame length must be compensated for in some way. Typically, packet segmentation and frame padding are used to force data to fit into a fixed frame size. Accordingly, it would be desirable to be able to transmit variable length data frames.

One environment in which variable length information packets is currently utilized the computer networking environment. As shown in prior art FIG. 1, a typical network packet structure includes a preamble 3 (for synchronization), a destination address 5, a packet size indicator 7, the data 9, and an error checking field 11. For wired computer network applications, it is typically assumed that the receiver can detect the beginning and end of each packet easily. This is because the signal to noise ratio on the wired channel of transmission is high.

Figure 1:
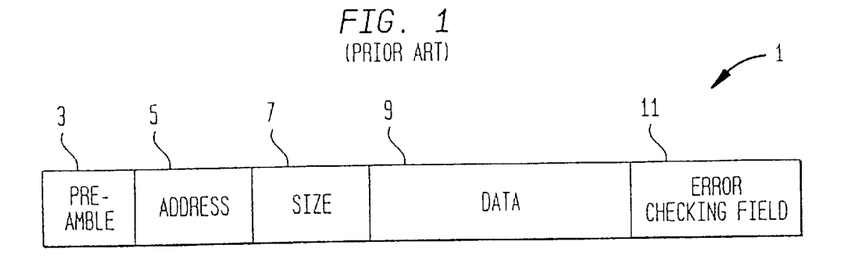
FIG. 1 illustrates a prior art data packet for transmission in a high signal to noise ratio communication environment.

A short preamble 3, provides the receiver time to find the beginning of the packet, achieve time synchronization, and read the packet size. The packet size indicator 7 indicates the size of the data field 9, and allows the system to in essence determine an end point of the packet in advance. The error checking field 11 is used to protect information in the packet, including the packet size indicator 7. If the error checking field 11 fails, the packet is thrown away.

In wireless networks, and other low signal to noise ratio environments, packet header in format on such as the size indicator 7 and error checking field 11 may be unreliable (may contain errors), and many packets of information would have to be discarded. Accordingly, such a package structure as shown in prior art FIG. 1 is not practical in wireless network and other low signal to noise ratio environments.

In particular, low signal to noise ratio environments necessitate the use of advanced error correcting codes. Coded symbols are typically received at a very low signal to noise ratio, making detection of the packet beginning and end difficult. Further, the packet size information in the packet header is coded, and cannot be read until after the packet boundaries are determined. Without reliable detection of the packet boundaries, data communication cannot proceed. For this reason, variable length packet transmisison in low signal to noise ratio situations has not been utilized.

In such wireless network systems, information is typically redundantly encoded so that if error bits are introduced, the information can be reconstructed without errors. In typical code division multiple access (CDMA) applications, if the original message includes "N" bits, the encoded message will include "2N" or "3N" bits.

SUMMARY OF THE INVENTION

Utilizing the apparatus and method of the present invention, variable length encoded data can be transmitted in low signal to noise ratio environments. By the apparatus and method of the present application, a particular data pattern is added to a beginning portion of encoded data to signify a beginning of the encoded data, and the same or another data pattern is added to end portion of the encoded data to signify the end of the encoded data. Further, since the encoded data itself may include the beginning or end data pattern or variations thereof and may therefore mistakenly indicate a beginning or end of the encoded data, the encoded data is first checked for such patterns. If such a pattern or similar patterns (likely to be mistaken for in low signal to noise ratio situations) are found within the encoded data, new patterns are substituted therefore. As such, variable length encoded data can be transmitted in a low signal to noise ratio environment, and can thereafter be easily decoded.

BRIEF DESCRIPTION OF THE DRAWINGS

The features, aspects and advantages of the present invention will become better understood with regard to the following description, appended claims, and accompanying drawings wherein like numerals represent like elements and wherein:

DETAILED DESCRIPTION OF THE PRESENT INVENTION

The present invention utilizes a particular data pattern, and adds it to the beginning of a data packet to signify the beginning of encoded data when transmitted in a low signal to noise ratio environment. The same or another data pattern is added to an end portion of the encoded data to signify the end of encoded data when transmitted in the low signal to noise ratio environment. Finally, to ensure that the encoded data itself does not include the beginning or end data pattern, and thus incorrectly indicate the beginning or ending of encoded data, the encoded data is first checked for the presence of the data patterns or similar data patterns used as a beginning and ending indicator of the encoded data. If these or similar patterns are found, another pattern is substituted therefore to avoid any incorrect detection of a beginning or end of the encoded data.

By utilizing a known or predetermined data patterns to signify the beginning and ending of encoded data, data of varying lengths can be transmitted in such data packets. Further, by substituting other data patterns therefore, or for nearest neighbors thereof, when they naturally occur in the encoded data, an indication of incorrect start and stop points of the transmitted data is avoided. Accordingly, by such a scheme, it is possible to transmit variable length encoded data in environments with low signal to noise ratios, such as in wireless networks.

Figure 2A:
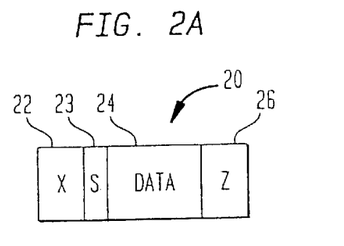
FIGS. 2a–2c illustrate sample data packets of the present invention.

FIG. 2A illustrates a typical data packet 20 of the present invention. The data packet 20 includes a first preamble data pattern 22, identified by "X" for example; a synchronization pattern 23, identified by "S" for example; data 24 of some varying length; and a postamble data pattern 26, identified by the variable "Z", added to the end of the data packet. It should be noted that "X" and "Z" have been generically chosen to respectively designate a first preamble data pattern and a second postamble data pattern which respectively identify the beginning and ending portion of encoded data, and should not be considered limiting in any way. Similarly "S" generically represents a synchronization data pattern which is detected after the preamble data pattern "X", the end of the data pattern "S" signifying the start of an encoded data sequence.

In its simples form, in one preferred embodiment, the preamble data pattern "X" may be chosen to be identical to the postamble data pattern "Z". But more preferably, the postamble data pattern "Z" is a subpattern of the preamble data pattern "X". As such, in continuous transmission of data as shown in FIG. 2c, even when timing errors occur and the data pattern "X" cannot be recognized, its subpattern "Z" can preferably be recognized. Thus, an end of packet will be recognized which, in a continuous data sequence, will indicate that a data pattern "S" should be looked for and thereafter, encoded data.

To overcome typical problems of low signal to noise ratio environments, such as multi-user interference or low signal power encountered in wireless communication, the first data pattern 22 ("X") added to the beginning of the data packet 20, is preferably about 8 or more symbols or bits. Through experimentation, it has been found that 16 bits (for data patterns "S" and "X") provides reliable detection and synchronization in communication over wireless channels. However, any number of bits or symbols may be used, depending on the situation, as long as the selected data pattern is known to both corresponding transmitters/encoders and receiver/decoders.

Accordingly, some predetermined pattern "X", of a predetermined length $l_x$, is chosen and inserted in the physical layer at the beginning of each data packet 20, with a synchronization pattern "S" inserted thereafter. The data pattern "Z" is preferably used to demarcate the end of the data packet 26, as shown in FIG. 2A, the data pattern "Z" preferably being at least a subset or subpattern of the data pattern "X" (i.e., X=01000000 and 25Z=0000). Further, the data pattern "Z" is typically chosen such that it can be easily recognized, despite occasionally received symbol errors and bit shifts in the sequence timing. An example of such a data pattern "Z" is one including all ones or all zeros.

The synchronization data pattern "S" typically follows the preamble data pattern "X" and can be viewed as a second portion of the first data pattern signifying the beginning of encoded data. The data pattern "S" is chosen such that it provides good synchronization for the beginning of encoded data. Examples of such data patterns "S" are known Barker sequences. The synchronization pattern "S" is typically chosen as a readily recognizable data pattern, despite occasional received symbol errors. The preamble data pattern "X" signifies to a receiver to search for the data pattern "S", and the data pattern "S" synchronizes the receiver such that after the data pattern "S" is received, encoded data begins. Of course, it should be noted that other link level information, including address information or fields, can be included between the data pattern "S" and the start of the data (noting that such must be known to both transmitter and receiver).

In one embodiment of the invention, data pattern "X" is chosen to have high auto correlation (low resolution), such as an all ones sequence. The data pattern "S" is chosen to have low auto correlation (high resolution), such as the aforementioned Barker sequences or random sequences.

Figure 2B:
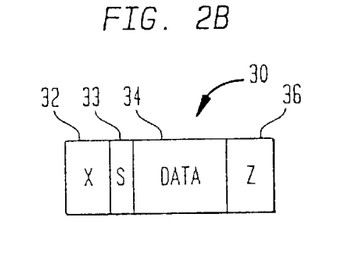
Figure 2C:
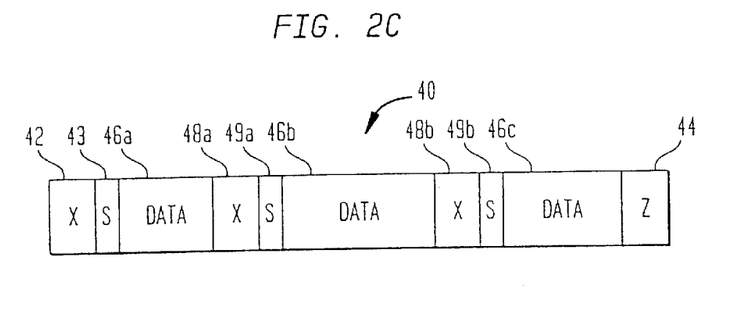

FIG. 2B illustrates another data packet 30, transmitted some period of time after data packet 20. Similar to data packet 20, data packet 30 includes the data pattern "X" at the beginning 32 of the encoded data; a synchronization pattern "S"; a data portion 34 which is shorter or varied in length from the data portion 24 of the data packet 20; and the data pattern "Z", added to the end portion 36 of the data packet 30. As shown in FIGS. 2A and 2B, for discontinuously transmitted packets, transmitted in an air interface with "dead air" in between them, each include separate markers "X" and "Z", respectively signifying the beginning and end of each packet.

FIG. 2C illustrates a situation involving continuously transmitted data packets 40. The data pattern "X" is included at the beginning 42 of the first data packet including data 46a, with the data pattern "S" being included thereafter at 43, indicating the beginning of the data sequence. Another data pattern "Z" is included at the end portion 44 of the last of the continuously transmitted data packets including data 46c. In such continuous transmission of data, the data pattern "X" and the data pattern "S" identified by 48a, 49a and 48b, 49b serve to indicate both the end of one portion of a group of data and the beginning of another group. For example, the data patterns "X", "S" identified by 48a, 49a indicate the end of the encoded data 46a, and also indicate the beginning of encoded data 46b. Similarly, the data patterns "X", "S" identified by 48b, 49b indicate the end of encoded data 46b, and the beginning of encoded data 46c. Thus, data patterns "X", "S" which would be essentially redundant can be dropped in such continuous transmission of data.

Accordingly, as are shown in FIGS. 2a to 2c, the data portions can be of varying lengths. Since lengths of data sections of data packets naturally vary in length, they no longer need to be forced into fixed size frames. For example, when a short data packet is to be transmitted, there is no need to send a fixed-sized data frame which includes mostly empty data. Instead, the end of the data packet is easily found by again detecting the known data pattern "X".

When transmitting data packets, such as those in FIGS. 2a to 2c, through a low signal to noise ratio environment such as air, it is possible to use different modulation schemes for the data patterns "X" and "Z", as compared to the rest of the data packet. As an example, the data patterns used to demarcate the beginning and end of a data packet, employ BPSK (Binary Phase Shift Keying) modulation, while the data portion are transmitted utilizing 8 PSK (Phase Shift Keying) or 16 QAM (Quadrative Amplitude Modulation), for example, depending on user location and radio environment. Regardless of the modulation scheme used for a particular data packet, the modulation used for the data patterns "X" and "Z", indicating the beginning and end of a data packet, would typically be fixed in order to simplify a unit at a receiving end, for detecting the data patterns.

Another aspect of the present invention addresses the fact that the data pattern "Z" may occur randomly in the data portion, such as in data portions 24, 34, and 46a–c in FIGS. 2A to 2C. (This assumes that the data pattern "Z" is a subpattern of the pattern "X" such that when "Z"'s are substituted for, then "X"'s need not be separately substituted for since the substitute of "Z"'s will remove all "X", s in the encoded data. However, if "Z" is not a subpattern of "X", "X" can be substituted for in the same manner described hereafter regarding "Z".) This potential problem is solved in the present invention by substituting a second data pattern for the data pattern "Z" in the encoded data upon determining that the encoded data includes the data pattern "Z". This will be described with regard to FIG. 3, for example.

Figure 3:
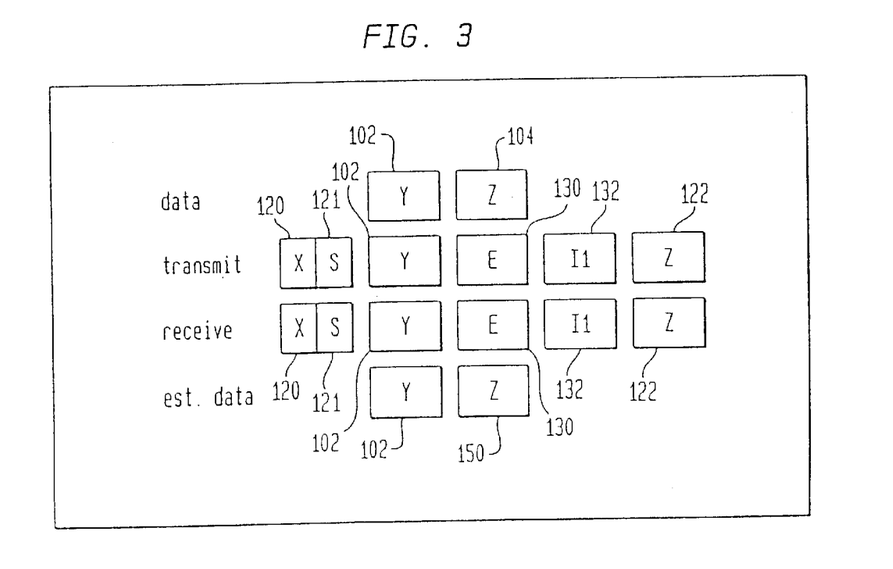
FIG. 3 illustrates data pattern substitution of the present invention.

FIG. 3 illustrates encoded data, including a first data pattern 102, indicated by "Y", and a second data pattern 104, indicated by "Z". Thus, the data pattern "Z", which has been chosen as the known data pattern which indicates the ending of a data packet, is present within the encoded data itself. In an effort to avoid an incorrect determination that data pattern "Z" is a data packet ending indicator, a new data pattern is substituted therefore, prior to transmission of the data.

More specifically, a data pattern "Z" is of a length $l_z$. If this data pattern "Z" is detected within the encoded data, a second data pattern including a first portion "E", of a predetermined length $l_E$ is used in place thereof. Similar to the first data pattern "Z", the second data pattern, including the first portion "E" thereof is one that need be known to corresponding encoder/transmitters and receiver/decoders of the system, but need only be of some known pattern and length. The first portion "E" of the second data pattern, indicated by element 130 in FIG. 3, identifies that a substitution in originally encoded data has been made.

As previously indicated, the second data pattern substituted for the data pattern "Z" includes a first portion "E", and further includes a second portion "I" identifying a type of data being removed by the substitution. This second portion of the data pattern is an indicator field, of length $l_I$ and is indicated by I1 shown as element 132 in FIG. 3. While each second portion "I" is an indicator field, preferably indicating a data pattern that has been substituted for in originally encoded data, the second portion "I" need only be one that is known to corresponding encoder/transmitters and receiver/decoders, and of known patterns and/or lengths.

Accordingly, as shown in FIG. 3, if the predetermined data pattern "Z", which is to be used to indicate the end of an encoded data packet, appears in originally encoded data, it is replaced with a second data pattern including a first portion "E" and a second portion "I". A particular second portion "I", such as "I1" (element 132 of FIG. 3), identifies that "Z" was the data pattern substituted for in the originally encoded data. Thus, with the original data pattern "Z" appearing in the originally encoded data, as indicated by element 104 of FIG. 3, a second pattern including a first portion "E", indicated by element 130 and a second portion "I1" indicated by element 132 in FIG. 3, is substituted therefore. As the data is being prepared for transmission, the data patterns "X" and "S" are first added to the beginning of the encoded data (after the aforementioned substitution has been made) as indicated by elements 120 and 121, and the data pattern "Z" is added to the end of the encoded data as shown by element 122. Thereafter, this variable length encoded data pattern is transmitted.

Preferably, regarding the actual data transmission, the data patterns "X" and "S" are effectively added to the encoded data after substitution, and transmitted first, separate from the encoded data. Thereafter, data portions "Y", "E" and "I1" are transmitted. Finally, the data pattern "Z" is effectively, added and transmitted, signifying the end of the data packet.

Additionally, in a further preferred embodiment, it is beneficial for the transmitter and receiver to not have to replace all occurrences of the data pattern "Z". Therefore, it should be understood that the invention may operate in a sequence synchronized mode where the encoded data is segmented into chunks of length $l_z$. Each chunk is then checked for the data pattern "Z" and is thereafter transmitted, rather than checking for all shifts of length $l_z$.

As shown in FIG. 3, what is received is a data pattern (preferably received as portions "X", "Y", "Y", etc.) which is the same as that transmitted, including the data pattern "X" indicating a beginning of the data packet as shown by element 120, the synchronization pattern "S" (121) and a last data pattern "Z" indicating the end of the data packet as indicated by element 122, along with the encoded data "Y" as shown by element 122 and the first ("E") and second ("I1") portions of the second data pattern substituted for the data pattern "Z", as shown by elements 130 and 132. When decoding the encoded data, the first portion of the second data pattern, represented by element "E" shown as 130 in FIG. 3, indicates that a substitution has been made. The indicator field I1, as shown by element 132, indicates that particular data pattern that has been substituted for, namely the data pattern "Z" in this case. Accordingly, utilizing this information, the first and second portions of the second data pattern are then be replaced with the data pattern "Z", as shown by element 150 of FIG. 3, to enable recovery of the correctly encoded data.

Similar to the problems which can occur when the data pattern "Z" occurs in the encoded data, due to its use as an indicator of the ending of an encoded data packet (and preferably as a portion of the data pattern "X" indicating the beginning of an encoded data packet, assuming "Z" is a subpattern or subset of "X"), if the data pattern "E" occurs in the originally encoded data, a problem may also occur. Specifically, since the data pattern "E" is used to identify that a substitution has been made, if this data pattern "E" appears in the originally encoded data, then it will incorrectly signify that a substitution has been made.

Figure 4:
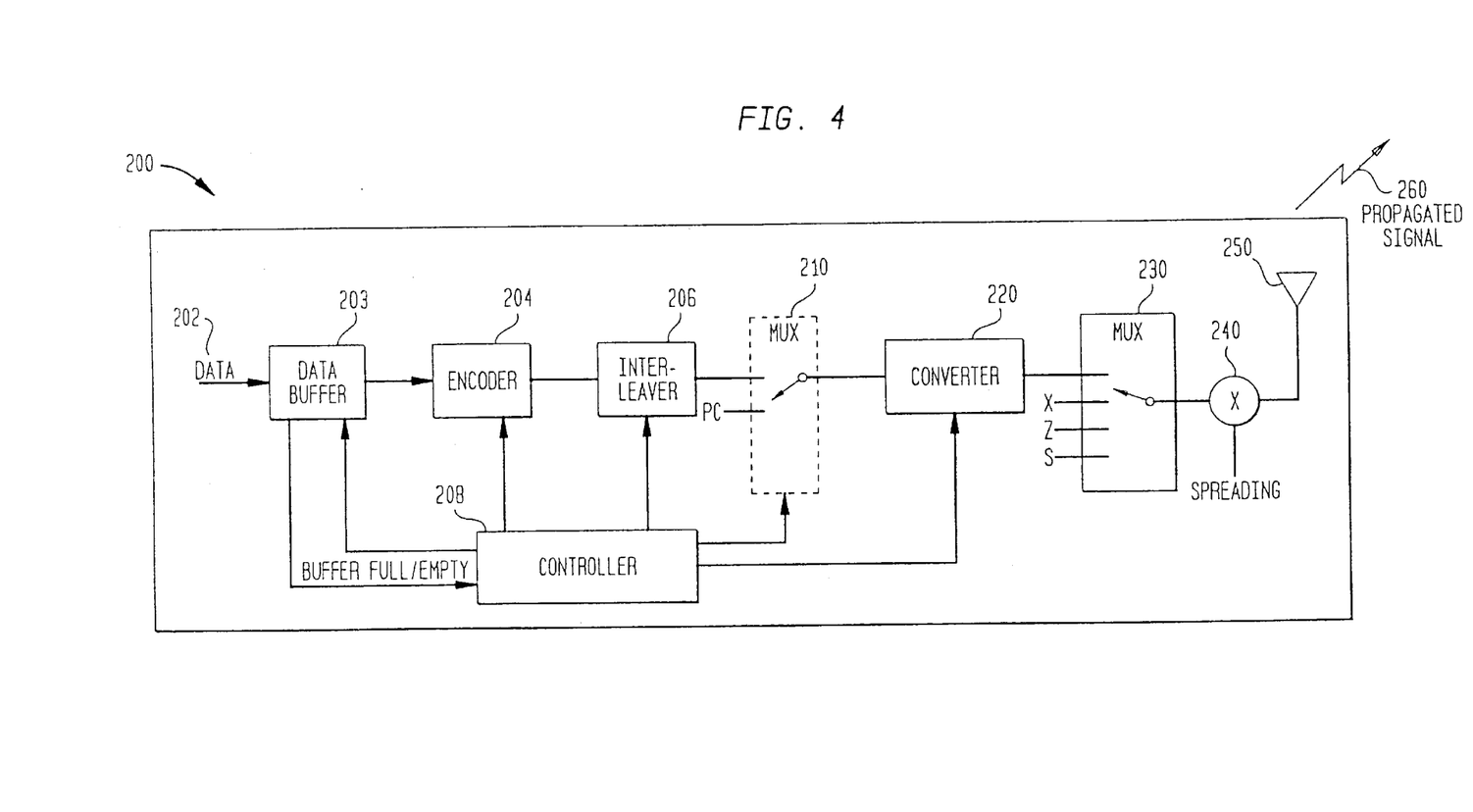
FIG. 4 illustrates an apparatus for preparing variable length encoded data for transmission.

To solve such a potential problem, if the data pattern "E" appears in the originally encoded data, it too is preferably replaced by a second data pattern, this second data pattern including a same portion "E" indicating that a substitution has been made, and a different second portion "I". This second portion "I" indicates that the data pattern "E" was present in the originally encoded data, and thus is different than the second portion "I1" used to indicate the data pattern "Z". Accordingly, a different second portion I2 of the second data pattern, not shown in FIG. 3, is used to indicate the presence of the data pattern "E" in the originally encoded data. Preferably, the second portion "I" of the second data pattern identifying the type of data originally present in the encoded data, is identified by data pattern (with the data pattern being different for the field "I" representing data pattern "Z" and field "I2" representing data pattern "E"). FIG. 4 illustrates an apparatus 200, for encoding data and for enabling variable length encoded data to be transmitted in an environment with a low signal to noise ratio. The apparatus 200 of FIG. 4 will be explained hereafter. It should be noted that many examples are given for wireless signal transmission as the low signal to noise ratio environment, but the invention is not limited to any particular low signal to noise ratio environment. Further, many examples given involve CDMA applications, but the variable length packeting scheme applications of the present application equally applies to other applications such as time division multiple access (TDMA), for example.

Initially, data 202 is preferably input to data buffer 203. A signal indicating buffer content is sent to controller 208. When the buffer 203 is full, data 202 is transferred to encoder 204. Of course, it should be noted that such buffering of data could merely be controlled by controller 208 and/or take place in encoder 204, thus eliminating the need for a separate data buffer 203.

Encoder 204, when the low signal to noise ratio environment is a wireless environment such as air, is preferably a forward error correction encoder for example. In a low signal to noise ratio environment, such as a wireless CDMA environment for example, the forward error correction encoder is utilized to redundantly encode data due to a naturally occurring problem of errors resulting from the low signal to noise ratio environment. Accordingly, if a data pattern consists of "N" bits, the FEC encoder outputs 2N or 3N bits of data.

Subsequent to the encoder 204, an interlever 206 is preferably connected. The interlever 206 operates, in a wireless system such as a CDMA system, to improve performance of an FEC encoder by reducing the impact of multiple errors in a row. Effectively, the encoded data is shuffled and/or bits are shifted by interlever 206. The use of an interlever 206 is common in wireless communication and thus further explanation will not be made.

The encoder 204 and interlever 206 are controlled by a controller 208, the controller 208 begins its control when an input buffer is full, and synchronizes the encoder 204 with a packet boundary of the data 202.

Connected to interlever 206 is a multiplexer 210. The multiplexer 210 multiplexes in, to the data output from interlever 206, power control bits every Nth bit, such as every 10 bits for example. These power control bits may be inserted by overwriting other bits in a known manner, and the PC bits advise other transmitters how power should be controlled.

The controller 208 causes the multiplexer 210 to include power control bits in the encoded data output from interleaver 206 and further controls the predetermined data patterns "X", "S" and "Z" to be multiplexed into the beginning and end of the encoded data, as will be explained later in more detail.

Connected to multiplexer 210 is a converter 220, the function of which will be explained in detail in relation to operation of the system. Briefly, the converter 220 examines the data itself, to determine whether or not the data pattern "Z" is present in the encoded data and substitutes a second pattern (including a first portion "E" and a second "I" for example) therefore. This converter 220 can include a memory, for example, including information regarding the data pattern "Z", so that it can compare the known data pattern "Z" to the encoded data to determine the presence or absence of the data pattern "Z". Further, such a memory preferably stores the additional data pattern "E", since the encoded data is also preferably examined for the presence of the pattern E. In addition, the memory further includes all the substitute data patterns including the first portion E and the various second portions $I_Z$, $I_E$, etc. It should be noted that the converter 220 not only checks for data patterns present in the encoded data, but also acts to substitute or replace a discovered data pattern with a new data pattern, when necessary.

Connected to the converter 220 is a multiplexer 230. The multiplexer 230 is controlled by controller 208 to add a predetermined data pattern "X" and a synchronization pattern "S" to the beginning of encoded data output from converter 220, including any substitutions made therein, and to add a predetermined data pattern "Z" to an end thereof. The data pattern "X" is inserted at the beginning of the encoded data to signify the beginning of the encoded data, along with the data pattern "S"; and the data pattern "Z" and is added to the end portion of the encoded data to signify the end of the encoded data. FIG. 4 also illustrates a spreader 240, for spreading the signal output from multiplexer 230 in a known manner. Other known components not shown can include a data modulator and power amplifier, preferably located between spreader 240 and antenna 250.

Finally, the signal output from spreader 240 is output through antenna 250 and transmitted as a propagated signal 260 into an environment with a low signal noise ratio, such as air. The spreader 240 and antenna 250 are shown in FIG. 4 to be included in the apparatus 200. However, such is not limiting as a spreader and/or an antenna external to the apparatus 200 may be used for signal transmission.

The propagated signal 260, embodied in a low signal to noise ratio medium such as air, includes a beginning segment including a data pattern "X" identifying a beginning of the propagated signal, a data pattern "S" and ending segment including the data pattern "Z" identifying an end of the propagated signal. Further, an encoded data segment is included therein. If the encoded data segment originally included the data pattern "Z", another data pattern is substituted therefore prior to signal propagation. In one preferred embodiment, for example, the propagated signal 260 is embodied in a carrier wave traveling through the air.

Figure 5:
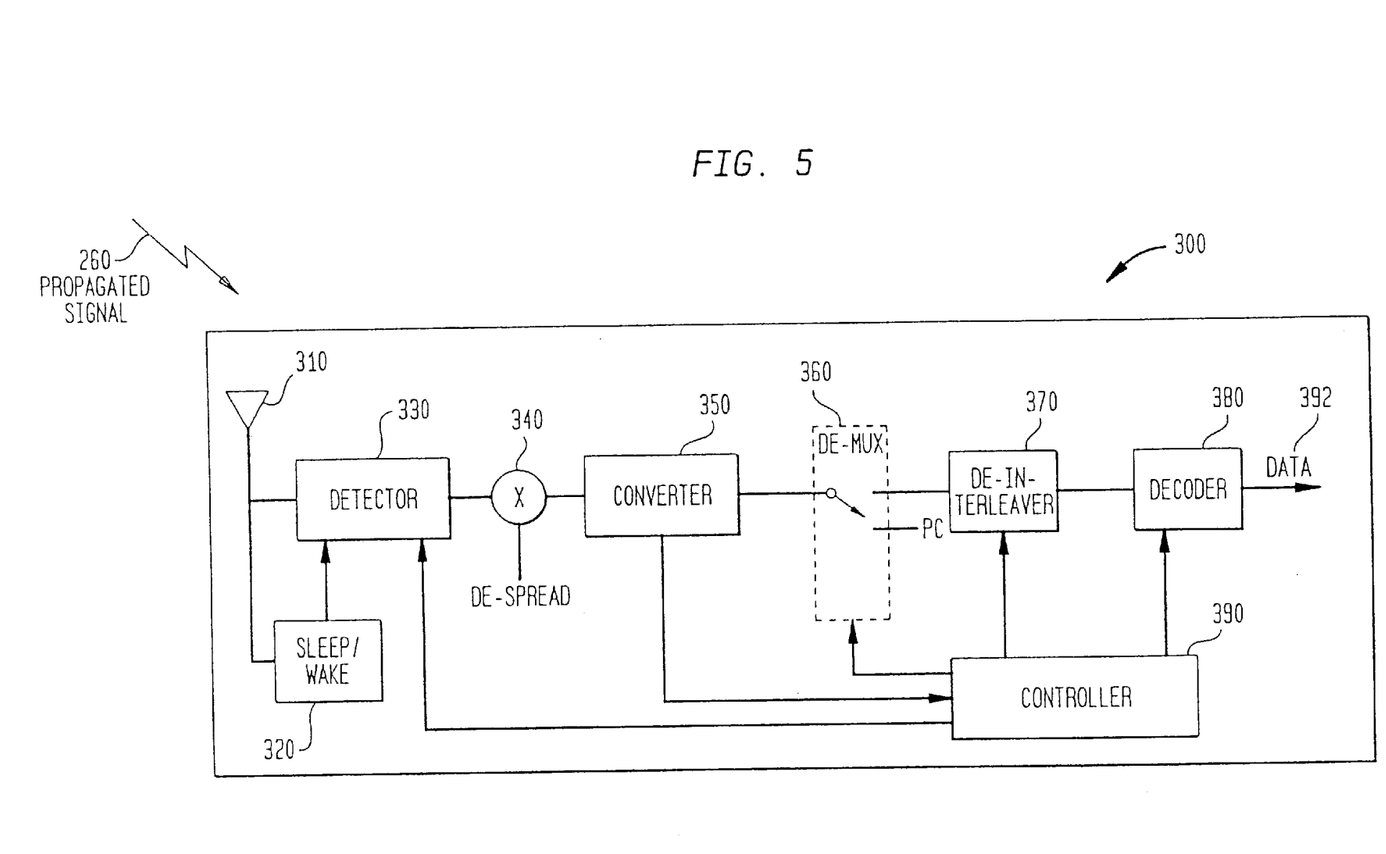
FIG. 5 illustrates an apparatus for decoding transmitted variable length encoded data.

FIG. 5 illustrates a decoding apparatus 300. Similar to apparatus 200, the description of the decoding apparatus 300 includes many references to wireless signal transmission, but is not limited thereto.

As shown in FIG. 5, the propagated signal 260 is received by an antenna 310. Again, such an antenna (and de-spreader 340) need not be included within decoding apparatus 300, but may be external thereto. Connected thereto is a detector 330, which is preferably a correlator in a wireless system. The correlator, preferably with sub-chip sampling, is matched to the data pattern "X". The detector 330, or correlator, is therefore adapted to detect the beginning portions of a received variable length encoded data signal by detecting a data pattern "X" for example. Once this data pattern is detected, a search is made for the data pattern "S" and a portion of encoded data is thereafter identified. Other known components not shown can include a front end receiver and timing circuit (which could be part of detector 330) and data demodulator located between detector 330 and de-spreader 340.

Thereafter, the signal output from detector 330 is input to de-spreader 340, to de-spread the signal in a known manner. A converter 350 is connected thereto which is adapted to determine whether or not a portion of the detected received variable length encoded data signal includes a second data pattern, including a first portion "E", subsequent to the data patterns "X" and "S". This first portion "E" of the second data pattern is used to identify any substitutions made in the encoded data signal. If such a second data pattern is included within the received variable length encoded data signal, a new data pattern is substituted therefore. Similar to converter 220, converter 350 preferably includes a memory storing all of the predetermined data patterns, including first and second portions thereof.

As will be explained in detail regarding system operation, once the data pattern "E" is discovered within the received variable length encoded data signal indicating that a substitution was made, a subsequent portion of the variable length encoded data signal is examined to determine which pattern "I" occurs thereafter. Depending on the pattern "I", one of a plurality of data patterns is substituted for the entire second data pattern, including the first portion "E" and the second portion "I". For example, if the data pattern "Z" (104) is originally present in the encoded data, the second pattern including the first portion "E" (130) and the second portion "I" (132) are present in the received data signal, and the data pattern "Z" (150) is substituted therefore by converter 350.

Thereafter, connected to converter 350 is demultiplexer 360, which separates out the power control bits from the encoded data. These control bits PC are easily separated out as they are transmitted unencoded, and as they occur at regular intervals within the encoded data. Connected to the demultiplexer 360 is a de-interlever 370. Finally, connected to de-interlever 370 is a decoder 380 decodes the encoded data signal, as modified by converter 350. This decoding takes place subsequent to the recognized data patterns "X" and "S", for example. The decoder 380 is preferably an FEC decoder. Since such decoders are known, the details of the FEC decoder will not be explained hereafter.

A controller 390 is also included in the decoding apparatus 300, to control the demultiplexer 360, the detector 330, the converter 350, the de-interlever 370, and the decoder 380. From decoder 380, data 392 is output, the data being equivalent to that of input data 202 of FIG. 4.

Additionally, decoding apparatus 300 may also include a sleep/wake circuit 320, connected to antenna 310 and detector 330. During long periods of time when no data is being received, the decoding apparatus 300 may go into a "sleep" mode to conserve battery power. The sleep/wake circuit 320 then acts to wake-up the decoding apparatus 300 in response to receipt of a paging signal received by antenna 310, for example, or energy received on a traffic channel, for example.

Figure 6:
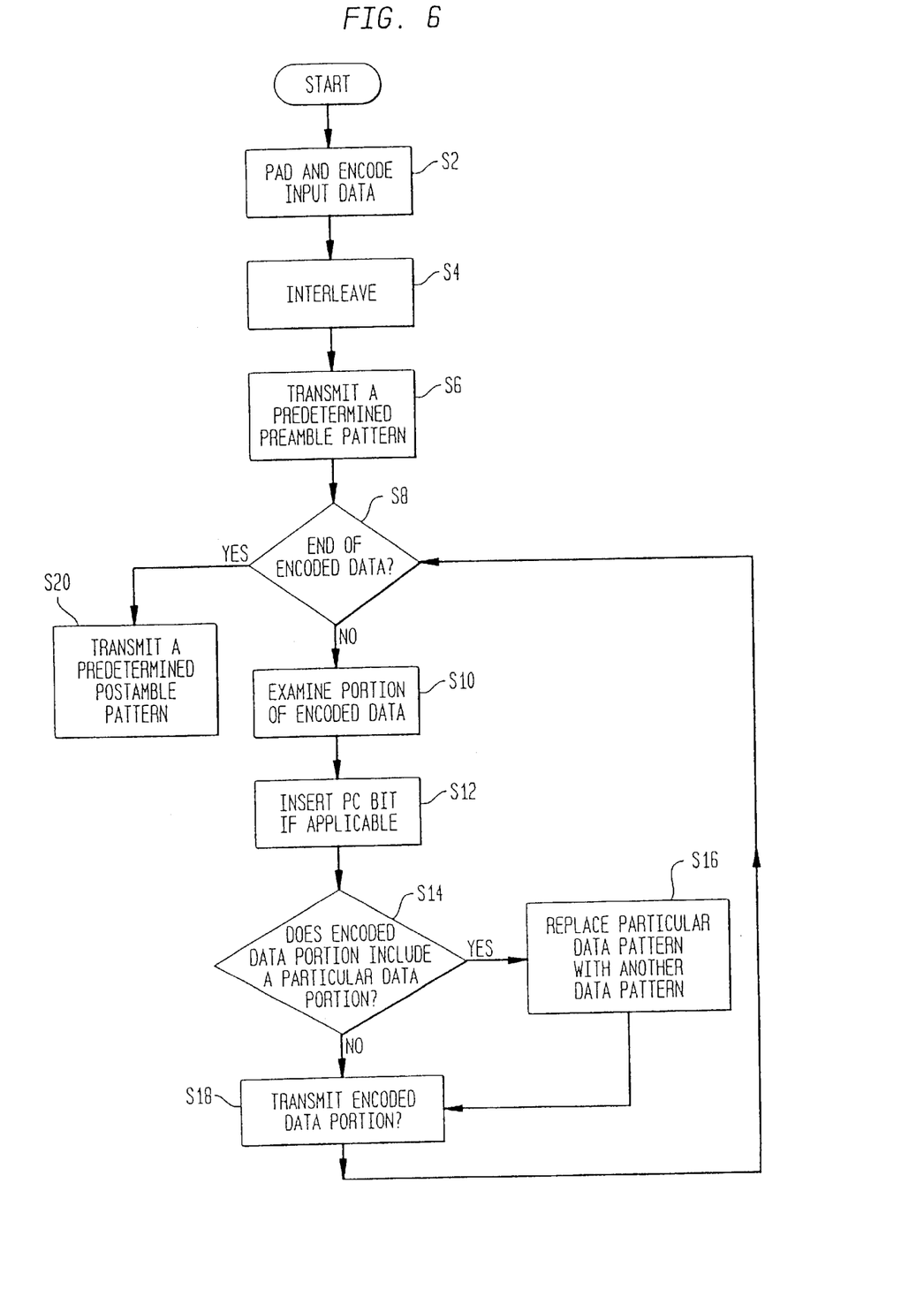
FIG. 6 illustrates a method, in one preferred embodiment of the present invention, for enabling variable length encoded data transmission.
Figure 7:
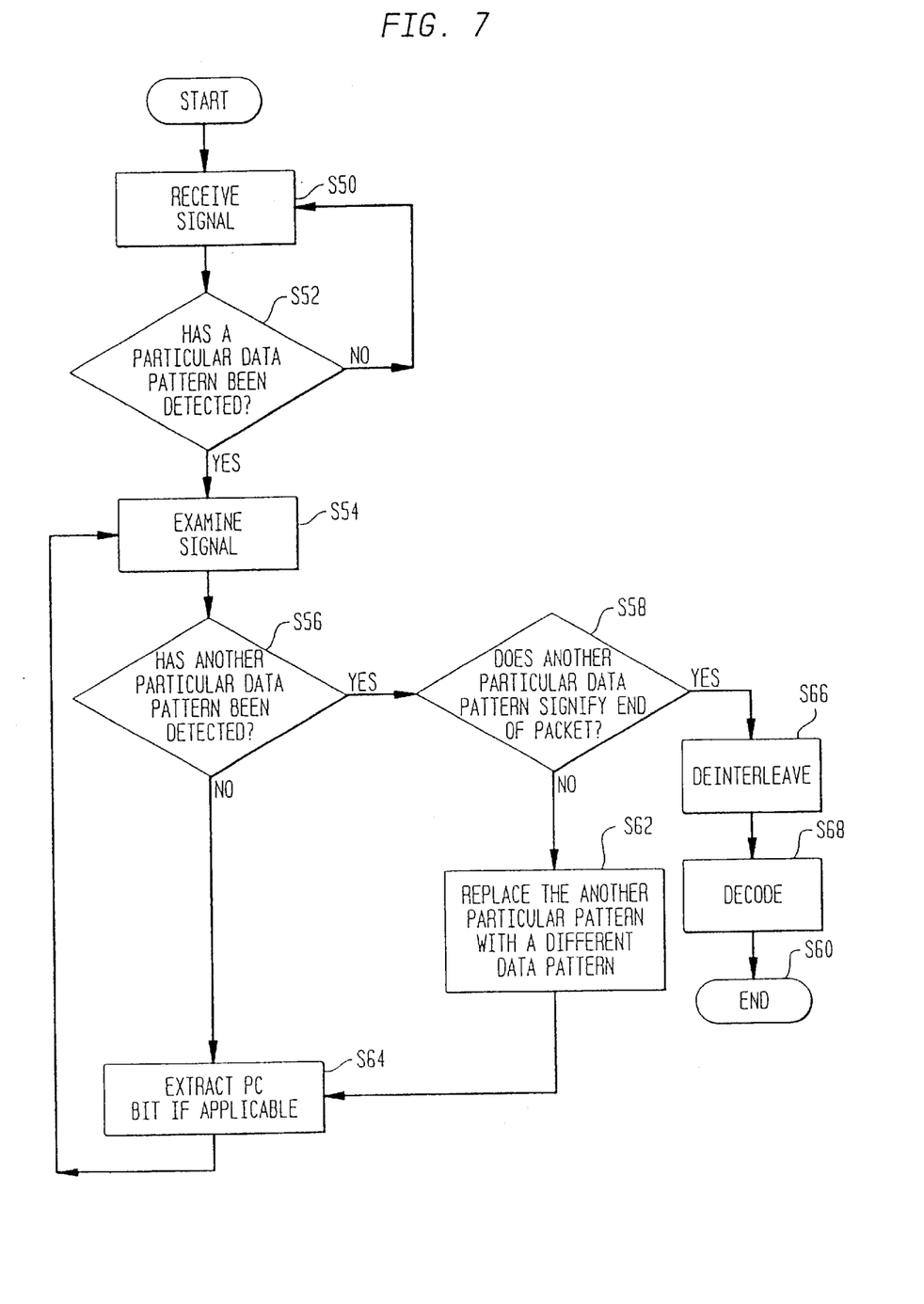
FIG. 7 illustrates, in one preferred embodiment of the present invention, a method for enabling decoding of received variable length encoded data.

FIGS. 6 and 7 briefly define the overall method for enabling transmission and receipt of variable length encoded data in a low signal to noise ratio environment. FIG. 6 illustrates the enabling of data transmission, and FIG. 7 illustrates the enabling of receipt and decoding of data.

Initially, as shown in FIG. 6, input data is padded (by FEC encoding in CDMA, for example) and encoded in Step S2. Thereafter, in Step S4, that data is shuffled or interleaved. In Step S6, assuming separate transmission of data portions, a data pattern "X" is added by multiplexer 230 (along with a synchronization data pattern "S",) and the data patterns "X" and "S" are transmitted. It should be noted that a preferred method of transmitting portions of a data packet, such as that shown in FIG. 2C, will be discussed regarding FIG. 6. This allows for the frequent insertion, allocation, and transmission of PC bits. However, the invention is not limited thereto and can include packetizing of an entire data packet such as that shown in FIG. 2C, prior to transmission, and transmitting of a complete data packet including beginning and ending data patterns "X" and "Z".

Thereafter, in Step S8, it is determined whether or not all encoded data has been transmitted. If not, a portion of the encoded data is examined in Step S10. This assumes that the encoded data signal has been apportioned or segmented using data buffer 203, for example, so that only portions of the encoded data signal need be examined for the presence of predetermined patterns. If necessary, PCs are inserted in Step S12.

Next, in Step S14, it is determined whether or not the encoded signal includes a particular data pattern, such as a predetermined pattern "Z" for example. If the encoded signal does include such a particular data pattern, that data pattern is replaced in Step S16 with another data pattern. For example, the data pattern "Z", if present in the encoded data, is replaced by a data pattern including a first portion "E" and a second portion "I", for example.

If the answer to Step S14 is NO, the method proceeds to Step S18. Similarly, once the particular data pattern has been replaced with another data pattern in Step S6, the system also proceeds to S18. At Step S18, the encoded data portion is transmitted if it does not include the particular data pattern (from Step S14), and the encoded data portion is transmitted including the replaced data patterns, if the encoded signal originally included the particular data pattern (from Step S16). Therefore, the encoded data portion transmitted in Step S18, for example, may include a substitute data pattern including a first portion "E" as indicated by element 130 and a second portion "I1" as indicated by element 132 of FIG. 3.

Finally, after data transmission is complete in Step S18, the system returns to Step S8 to examine whether or not the end of the encoded data has been reached. If there are additional encoded data portions, the method proceeds to Step S10. If the end of the encoded data has been reached in Step S8, then the system proceeds to Step S20. In Step S20, a predetermined postamble pattern "Z" is transmitted, to signify the end of the encoded data signal. Again, it must be stated that the invention encompasses the assembling and transmission of a complete data packet such as that shown in FIG. 2a, with preamble and postamble data portions "X" and "Z" (and synchronization pattern "S") added to the encoded data pattern prior to transmission.

FIG. 7 briefly explains how variable length encoded data is received and decoded. In Step S50, a signal is received. Thereafter, in Step S52, the signal is examined to determine whether or not the particular data pattern "X" has been detected. If no such data pattern "X" is detected, the system reverts back to Step S50 and awaits receipt of another signal. However, if the particular data pattern "X" is detected in S52, then the received signal is examined for the presence of the data pattern "S". If so, then this signifies that the signal after the data pattern "S", used to synchronize the decoding apparatus 300, is the encoded signal and the signal is further examined in Step S54.

In Step S56 it is determined whether or not another particular data pattern has been detected. If so, then the method moves to Step S58 to determine whether or not the particular pattern is a "Z" pattern, signifying the end of a data packet.

If the particular data pattern is not the "Z" pattern in Step S58, the method moves to Step S62. If, in Step S56, another particular data pattern, such as the data pattern including a first portion "E", has been detected, the entire data pattern, including a first portion "E" and a second portion "I", are replaced in Step S62 with another data pattern, this being dependent upon the particular second portion "I" detected. For example, as shown in FIG. 3, if the data pattern "E", indicated by element 130 and the data pattern "I1", indicated by element 132 are detected, then the data pattern "Z", indicated by element 150 is substituted therefore. Thereafter, the method proceeds to Step S64. Similarly, if no particular data pattern has been detected in Step S56, the method proceeds to Step S64.

In Step S64, PC bits are extracted, if applicable, and the method returns to Step S54 where the incoming signal is examined. The method is repeated until, in steps S56 and S58, it is determined that a data pattern "Z" is detected, signifying the end of the encoded data signal. Thereafter, in Step S66, de-interleaving takes place. Decoding of the encoded data signal takes place thereafter in Step S68. If so, the method ends in Step S60.

Accordingly, by the apparatus and method of the present invention, a data pattern is determined, which remains known to the apparatus 200 and the decoding apparatus 300. This data pattern "X", is thereafter used to indicate an incoming variable length encoded data signal, and to achieve timing synchronization to enable detection of the beginning of the variable length encoded data signal (with data pattern "S"). Another data pattern "Z", which may be the same as or a subset of the data pattern "X", is used to determine an end of variable length encoded data. The known data patterns "X" and "Z" must typically be longer than that normally used in wired applications, in order to enable the variable length encoded data to be transmitted in an environment with low signal to noise ratio, such as that of air used in wireless communications. This is necessary to overcome the low signal to noise ratio situation, fading, etc. which normally occurs in a wireless channel. Further, although preferably used in wireless communication, the present invention may be used in wired applications, especially those with low signal to noise ratios.

Figure 8:
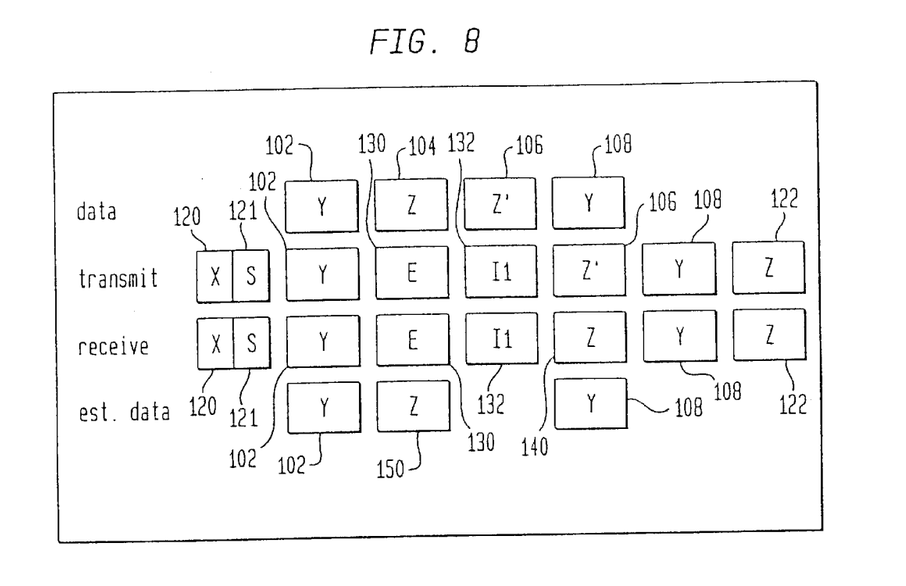
FIG. 8 illustrates potential data pattern substitution problems.

In further preferred embodiment of the present application, additional data patterns resembling the data pattern "E" and the data pattern "Z" are also preferably replaced when they naturally occur in the encoded data. FIG. 8 illustrates one example where not only the data pattern "Z", used to indicate the end of variable length encoded data and the data pattern "E"indicating a substitution of data, but also a data pattern Z', resembling the data pattern "Z", needs replacement.

In the example shown in FIG. 8, encoded data includes a first portion "Y", indicated by element 102; a second portion "Z" indicated by element 104, a third portion Z'indicated by element 106, and a fourth portion "Y" indicated by element 108. In preparing the data for transmission, the predetermined data patterns "X" (120) and "S" (121) are added to the beginning of the encoded data, and the data pattern "Z" (122) is added to the end of the encoded data. A substitution for the data pattern "Z" indicated by element 104 is made, wherein a data pattern including a first portion "E", indicated by element 130 and a second portion I1, indicated by element 132 is made. However, in the example shown in FIG. 8, no substitution is made for the pattern "Z'" as indicated by element 106.

When the encoded data signal is received, the pattern "X", indicated by element 120, is initially recognized, as is the synchronization pattern "S" (121). Thereafter, the encoded data signal is read to include the pattern "Y", indicated by element 102, and the data pattern including a first portion "E" indicated by element 130 and a second portion "I1", indicated by element 132. The pattern "Y" is decoded as shown by element 102 and the pattern "Z" is decoded as shown by element 150, from the portions "E" and "I1". However, during transmission of the signal, since "Z'" closely resembles the data pattern "Z", an error may occur when the received signal is received. Thus, instead of recognizing that a pattern "Z'" is received, as indicated by element 106, the received pattern may be mistakenly identified as another pattern "Z" as indicated by element 140, and an error may occur.

Accordingly, as shown in FIG. 8, instead of decoding the pattern "Z'" as indicated by 106, and thereafter decoding the pattern "Y" as indicated by element 108 until another pattern "Z" as indicated by element 122 is recognized, a packet ending is signalled since another element "Z" is inadvertently recognized as indicated by element 140. Thus, instead of the signal being properly decoded as including the data patterns "Y", "Z", "Z'" and "Y", it is decoded as a data pattern "Y, Z" as shown by elements 102 and 150 of FIG. 8, with a second data pattern being decoded as a data pattern "Y", as shown by element 108 of FIG. 8. This may occur because the received data signal may be perceived as including a first pattern "X" indicated by element 120 indicating the beginning of a data pattern, a second data pattern "Z" as indicated by element 140 indicating an end of a first encoded data signal; and another data pattern "Z", indicated by element 122, indicating the end of a second data pattern. Again, this may occur because the originally encoded data pattern 106 includes a pattern resembling or very close to a data pattern "Z".

Figure 9:
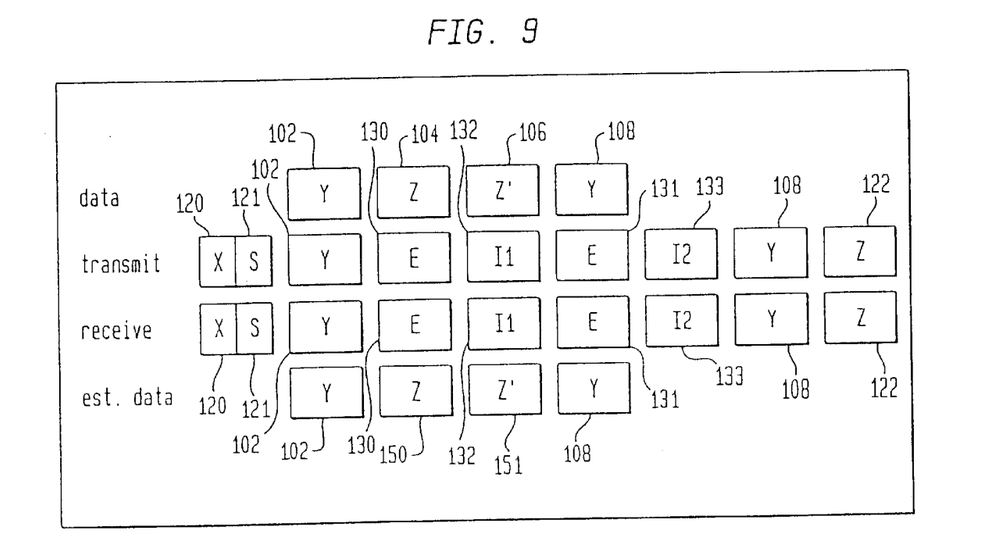
FIG. 9 illustrates data pattern substitution of another preferred embodiment of the present invention.

FIG. 9 illustrates another preferred embodiment of the present application where not only is the data pattern "Z" substituted for when it naturally occurs in the encoded data, the data pattern Z', as indicated by element 106, is also substituted for. In this situation, prior to transmission of the data, the data patterns "X" and "S" (120, 121) are added to the beginning of the encoded data and the data pattern "Z" (122) is added to the end of the encoded data; the data pattern "Z" as indicated by element 104 is detected within the encoded data and a pattern including a first portion "E", as indicated by element 130 and a second portion "I1" as indicated by element 132 is substituted therefore.

Further, within the encoded data, it is recognized that a data pattern "Z'", as indicated by element 106, also exists. Accordingly, a substitution is also made for the data pattern "Z'", as indicated by element 106, wherein a data pattern with a first portion "E", as indicated by element 101 is substituted therefore, along with a second portion I2 as indicated by element 133. This element "I2" is preferably of a different pattern than element "I1" such that, when decoded, element "Z'" will be substituted therefore as shown by element 151 of FIG. 9. Accordingly, in such a further preferred embodiment of the present invention, the original encoded data signal including data patterns "Y", "Z", "Z'" and "Y" are properly decoded and recovered, thereby avoiding the problems shown in FIG. 8.

In an even further preferred embodiment, not only are data patterns "Z", "Z'", and "E" preferably substituted for when naturally occurring in an encoded data signal, but also a data pattern "E'" (resembling the data pattern E), is preferably also substituted for. Thus, for each of the four known data patterns, a data pattern with a first portion "E" will be substituted therefore, and one of a second portion "I1", "I2", "I3" or "I4", will be substituted therefore. Each of "I1" to "I4" indicate the type of data that was substituted for. Preferably, each of I1 to I4 identifies the type of data being substituted by pattern. Thus, each of I1 to I4 are preferably of different patterns.

More specifically, in this additional preferred embodiment, in an effort to prevent the decoding of a false signal, the apparatus and method of the present invention preferably flags variations or "nearest neighbor" sequences of data patterns "Z" and "E". A neighbor set, which can include more than 1 variation of Z, can be set as $Z_j$ as a set of data patterns that differ from Z in j places. Similarly, $E_j$ can represent a set of data patterns that differ from E in j places. Thus, each of "E'" and "Z'" can equate to a plurality of patterns to be substituted for.

Assuming j equals 1 for simplicity, with Z equaling 0101, there are four neighbor data patterns: 1101; 0001; 0111; and 0100. As such, if any of the four data patterns are detected, they are substituted for by a data pattern including a first portion "E", and including one of four second portions "I". Four similar data patterns are preferably replaced with regard to $E_j$. Each data pattern is replaced by a data pattern including the first portion "E", followed by a second portion "I" that uniquely identifies each pattern. Each of the data patterns to be checked within an encoded signal is preferably stored in memory, along with patterns to be substituted therefore. Similarly, such patterns are also preferably stored in memory for decoding.

Further, additional preferred embodiments of the present application similarly deal with situations where a data pattern "E" could be estimated as a data pattern "E'". In such a situation, an escape sequence may not be detected and an encoded signal may not be properly decoded. Finally, a data pattern "E'" may be estimated as a data sequence E, leading to an extra escape sequence substitution.

Such potential situations can be mitigated by correctly choosing a set of escape sequences ("Z", "E", "$Z_j$" and "$E_j$") as a function of j, with sequence patterns "$I_Z$", "$I_E$" and "$I_j$". The more sequences added, while increasing accuracy, may increase cost and time spent on substituting data patterns when transmitting and receiving data. Thus, although all such aspects are included within the present invention, practicalities must also be considered as time and cost must be balanced with accuracy.

The field "I" may also preferably be coded to increase the distance between two sequences "I1" and "I2", for example. Error detection may be improved when transmitting high level protocol data packets that contain a length field or a CRC check that can be used to detect and reject an incorrect operation.

Accordingly, with the ability to correctly determine the beginning and ending of encoded data signals, variable length encoded data signals can be transmitted in low signal to noise ratio environments, such as wireless communication environments. Further, by substituting for certain patterns within encoded data, incorrect indications of variable length encoded data signals can be avoided.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:
1. A method of decoding an encoded data signal, comprising:
   detecting a beginning portion of a received encoded data signal by detecting a first data pattern;
   determining, upon detecting the first data pattern of received encoded data signal, whether or not a subsequent portion of the received encoded data signal includes a second data pattern;
   substituting a new data pattern for the second data pattern in the received encoded data signal, upon determining inclusion of the second data pattern;
   determining an end portion of the received encoded data signal by detecting a third data pattern in the received encoded data signal; and
   decoding the received encoded data signal, including any substituted new data pattern.

2. The method of claim 1, further comprising:
   determining, upon determining inclusion of a second data pattern, whether a fourth or fifth data pattern succeeds the second data pattern in the received encoded data signal; and
   substituting a first new data pattern for the second and fourth data patterns upon determining existence of the fourth data pattern and substituting a second new data pattern for the second and fifth data patterns upon determining existence of the fifth data pattern.

3. The method of claim 1, further comprising:
   determining, upon determining inclusion of a second data pattern, which one of a plurality of data patterns succeeds the second data pattern in the received encoded data signal; and
   substituting one of a plurality of new data patterns, dependent upon which one of a plurality of data patterns is determined to succeed the second data pattern, for the second data pattern and the determined succeeding data pattern in the received encoded data signal.

4. The method of claim 1, further comprising the step of: transmitting the encoded data in wireless communication.

5. The method of claim 1, wherein the step of decoding includes,
   forward error correction decoding.

6. The method of claim 1, wherein the data signal is received in a wireless communication device.

7. The method of claim 1, wherein the plurality of data patterns are prestored in memory.

8. The method of claim 1, wherein the third data pattern is a subpattern of the first data pattern.

9. The method of claim 1, wherein the first data pattern includes a first portion signifying the beginning of the encoded data and a second synchronization portion.

10. An apparatus for decoding an encoded data signal, comprising:
   a first detector, adapted to detect a beginning portion of a received encoded data signal by detecting a first data pattern;
   a converter, adapted to determine whether or not a portion of the detected received encoded data signal includes a second data pattern subsequent to the first data pattern, and adapted to substitute a new data pattern for the second data pattern in the received encoded data signal upon determining inclusion of the second data pattern; and
   a decoder, adapted to determine an end portion of the received encoded data signal by detecting a third data pattern in the received data signal and adapted to decode the received encoded data signal, including any substituted new data pattern.

11. The apparatus of claim 10, wherein the converter, upon determining inclusion of a second data pattern, is adapted to detect one of a plurality of data patterns, in the encoded data signal, subsequent to the second data pattern and is adapted to substitute one of a plurality of new data patterns for the second data pattern and detected one of a plurality of data patterns.

12. The apparatus of claim 10, wherein the encoded signal is received in a wireless communication environment.

13. The apparatus of claim 10, wherein the encoded data signal is received in a wireless communication device.

14. The apparatus of claim 10, further comprising a memory for storing the first, second and a plurality of data patterns and the plurality of new data patterns.

15. The apparatus of claim 10, wherein the decoder is a forward error correction decoder.

16. The apparatus of claim 10, wherein the first data pattern is a subpattern of the third data pattern.

17. The apparatus of claim 10, wherein the first data pattern includes a first portion signifying the beginning of the variable length encoded data and a second synchronization portion.

* * * * *